United States Patent
Justice, Jr. et al.

(10) Patent No.: US 6,418,469 B1
(45) Date of Patent: *Jul. 9, 2002

(54) MANAGING CONDITIONS IN A NETWORK

(75) Inventors: William D. Justice, Jr.; Richard A. Stupek, Jr., both of Houston, TX (US)

(73) Assignee: Compaq Information Technologies Group, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,410

(22) Filed: Sep. 30, 1997

(51) Int. Cl.[7] .......................... G06F 15/177; G06F 17/40
(52) U.S. Cl. .......................................... 709/224; 707/10
(58) Field of Search ..................... 340/825.16; 709/223, 709/224, 226, 202, 250, 300; 707/10, 500, 501

(56) References Cited

U.S. PATENT DOCUMENTS

| | | | | | |
|---|---|---|---|---|---|
| 5,210,530 A | * | 5/1993 | Kammerer et al. | ..... | 395/200.53 |
| 5,528,516 A | * | 6/1996 | Yemini et al. | ............... | 702/181 |
| 5,696,701 A | * | 12/1997 | Burgess et al. | ............... | 714/25 |
| 5,748,098 A | * | 5/1998 | Grace | .................... | 340/825.16 |
| 5,790,797 A | * | 8/1998 | Shimada et al. | ........ | 395/200.54 |
| 5,799,317 A | * | 8/1998 | He et al. | .................... | 707/104 |
| 5,812,750 A | * | 9/1998 | Dev et al. | | |
| 5,826,253 A | * | 10/1998 | Bredenberg | | |
| 5,828,882 A | * | 10/1998 | Hinckley | .................... | 709/223 |
| 5,832,224 A | * | 11/1998 | Fehskens et al. | ...... | 395/200.53 |
| 5,887,135 A | * | 3/1999 | Dahlen et al. | .............. | 709/250 |
| 6,012,152 A | * | 1/2000 | Douik et al. | ................... | 714/26 |
| 6,021,262 A | * | 2/2000 | Cote et al. | ................... | 709/223 |
| 6,023,507 A | * | 2/2000 | Wookey | ...................... | 709/224 |
| 6,044,387 A | * | 3/2000 | Angiulo et al. | | |
| 6,061,685 A | * | 5/2000 | Fantenberg | .................. | 707/10 |
| 6,125,390 A | * | 9/2000 | Touboul | ..................... | 709/223 |
| 6,131,112 A | * | 10/2000 | Lewis et al. | ................ | 709/206 |

OTHER PUBLICATIONS

Rahman et al., "An Intergrated Load Forecasting—Load Management Simulator: Its Design and Performance", IEEE Transactions on Power Systems, vol. 4, No. 1, pp. 184–189, Feb. 1989.*

Theimer et al., "Dealing with Tentative Data Values in Disconnected Work Groups", Mobile Computing Systems and Applications, pp. 192–195, Feb. 1989.*

Case et al., *Management Information Base for Version 2 of the Simple Network Management Protocol (SNMPv2)*, Internet, Request for Comments: 1907 (Jan. 1996), 17 pages.

Deering, *Host Extensions for IP Multicasting*, Internet Request for Comments: 1054, Stanford University (May 1988), 17 pages.

(List continued on next page.)

*Primary Examiner*—Mark H. Rinehart
*Assistant Examiner*—Marc D. Thompson
(74) *Attorney, Agent, or Firm*—Fletcher, Yoder & Van Someren (57) ABSTRACT

Apparatus and method of managing conditions in a network of network devices. A management system identifies conditions on the network by periodically polling the network devices or in response to a message from a network device. The management system maintains an event list that keeps track of the network conditions. The event list is automatically updated (entries added or removed) by the management system as conditions appear or become resolved.

19 Claims, 11 Drawing Sheets

OTHER PUBLICATIONS

Armstrong et al., *Multicast Transport Protocol*, Internet, Request for Comments 1301, Xerox et al., (Feb. 1992), 33 pages.

Deering, *Host Extensions for IP Multicasting*, Internet, Request for Comments: 988, Stanford University (Jul. 1986), 18 pages.

Wimer, *Clarifications and Extensions for the Bootstrap Protocol*, Internet, Request for Comments 1542, Carnegie Mellon University (Oct. 1993), 19 pages.

Croft et al., *Bootstrap Protocol (BOOTP)*, Internet, Request for Comments 951, Stanford University et al. (Sep. 1985), 10 pages.

Alexander et al., *DHCP Options and BOOTP Vendor Extensions*, Internet, Request for Comments 1533, Lachman Technology, Inc. et al., (Oct. 1993), 25 pages.

DROMS, *Dynamic Host Configuration Protocol*, Internet, Request for Comments 1541, Bucknell University (Oct. 1993), 32 pages.

Reynolds, *BOOTP Vendor Information Extensions*, Internet, Request for Comments 1497, ISI (Aug. 1993), 7 pages.

Case et al., *A Simple Network Management Protocol (SNMP)*, Internet, Request for Comments 1157, SNMP Research et al. (May 1990), 32 pages.

Socolofsky et al., *A TCP/IP Tutorial*, Internet, Request for Comments 1180, Spider Systems Ltd. (Jan. 1991), 25 pages.

Kessler et al., *A Primer on Internet and TCP/IP Tools*, Internet, Request for Comments 1739, Hill Assoc., Inc. (Dec. 1994), 40 pages.

Allen, *Novell IPX Over Various WAN Media (IPXWAN)*, Internet, Request for Comments 1634, Novell, Inc. (May 1994), 19 pages.

Hewlett Packard, *HP Openview Professional Developer's Kit*—Version D.01, Internet Web Page (1996), 3 pages.

Hewlett Packard, *HP Openview Workgroup NODE Manager*, Internet, Web Page (1994), 3 pages.

* cited by examiner

ACTINFO

| ACTION NUMBER 300 | ENABLED 302 | ACTION TYPE 304 | UPDATE TYPE 306 | SEVERITY 308 | BITMAP ID 310 | DESCRIPTION 312 |
|---|---|---|---|---|---|---|
| 5000 | Y,N | TYPE OF ACTION | TIMED OR TRAP FROM DEVICE | | | |
| 10000 | | | | 1 | 1014 | REPLACE PROCESSOR |
| 10001 | | | | 2 | 1016 | CHECK CRITICAL ERROR LOG |
| 10002 | | | | 1 | 1013 | CHECK ASR |
| 10003 | | | | 2 | 1012 | CHECK CORRECTABLE MEMORY LOG |
| 10004 | | | | 2 | 1015 | CHECK POWER ON MESSAGE LOG |
| 10005 | | | | 1 | 1011 | CHECK SYSTEM TEMPERATURE |
| 10006 | | | | 1 | 1011 | CHECK SYSTEM FANS |
| 10007 | | | | 1 | 1010 | CHECK POWER SUPPLY |
| 11000 | | | | 1 | 1010 | CHECK AC POWER FOR UPS - FAILED |
| 11001 | | | | 1 | 1010 | REPLACE DRIVE |
| 11050 | | | | 1 | 1010 | DEGRADED DRIVES |
| 11500 | | | | 1 | 1010 | POSSIBLE BAD ACCELLERATOR DATA |
| | | | | 1 | 1017 | REPLACE SCSI TAPE DRIVE |

*FIG. 4*

ACT_PROC

| ACTION NUMBER 400 | DEF COUNT 402 | ITEM NAME 404 | DATA SOURCE 406 | CHECK TYPE 408 | COMP TYPE 410 | DATA 412 | NOT 414 | OPERATOR 416 |
|---|---|---|---|---|---|---|---|---|
| 5000 | 1 | CPQSECPUSTATUS | SNMP | 1 | 112 | 112 | 0 | 0 |
| 10000 | 1 | CPQHECRITLOGCONDITION | | 1 | 112 | 112 | 0 | 0 |
| 10001 | 1 | CPQHEASRCONDITION | | 1 | 103 | 103 | 0 | 0 |
| 10002 | 1 | CPQHECORRMEMLOGCONDITION | | 1 | 112 | 112 | 0 | 0 |
| 10003 | 1 | CPQHEPOSTMSGCONDITION | | 1 | 112 | 112 | 0 | 0 |
| 10004 | 1 | CPQHETHERMALTEMPSTATUS | | 1 | 104 | 104 | 0 | 0 |
| 10005 | 1 | CPQHETHERMALCPUFANSTATUS | | 1 | 112 | 112 | 0 | 0 |
| 10006 | 1 | CPQHEFLTTOPWRSUPPLYCONDITION | | 1 | 112 | 112 | 0 | 0 |
| 10007 | 1 | CPQUPSMIBCONDITION | | 1 | 104 | 104 | 0 | 2 |
| 11000 | 1 | CPQDAPHYDRVSTATUS | | 1 | 104 | 104 | 0 | 2 |
| 11000 | 2 | CPQSCSIPHYDRVSTATUS | | 1 | 104 | 104 | 0 | 2 |
| 11000 | 3 | CPQDASPARECONDITION | | 1 | 103 | 103 | 0 | 2 |
| 11001 | 1 | CPQDAPHYDRVSTATUS | | 1 | 103 | 103 | 0 | 0 |
| 11001 | 2 | CPQSCSIPHYDRVCONDITION | | 1 | 103 | 103 | 0 | 0 |
| 11050 | 1 | CPQDAACCELBADDATA | | 1 | 112 | 112 | 0 | 0 |
| 11500 | 1 | CPQTAPEPHYDRVCONDITION | | 1 | | | | |

HUMAN RESOURCES - REPLACE DRIVE

DESCRIPTION:
THE DISK DRIVE IN SLOT 5 OF THE PROLIANT STORAGE SUB SYSTEM IN SLOT 2 FAILED ON FRIDAY NOV. 1, 1994 AT 2:03 A.M.

DETAILS:
THE DRIVE FAILED BECAUSE OF SOME KIND OF DISK ERROR.

TO FIX PROBLEM:
1) ORDER A NEW DRIVE DRIVE TYPE XX322311
2) REPLACE THE DRIVE
3) WAIT FOR THE DRIVE TO REBUILD

CLOSE

*FIG. 7*

ACTION LIST LOG

| ACTION TYPE | DEVICE NAME | DATE RECORDED | DATE RESOLVED |
|---|---|---|---|
| REPLACE DRIVE NOW | ACCOUNTING | 11/01/94 8:30 AM | 11/05/94 10:16 AM |
| TAPE BACKUP FAILED | HUMAN_RESOURCES | 10/31/94 10:26 PM | |
| STORAGE SPACE LOW | DWEEBO | 9/16/94 12:04 AM | 9/22/94 3:31 PM |
| UPGRADE SYSTEM ROM | ACCOUNTING | 9/16/94 11:56 AM | |
| UPGRADE SYSTEM ROM | SALES | 8/10/94 2:20 PM | 9/30/94 1:20 PM |
| DRIVE UPGRADE AVAILABLE | DWEEBO | 8/09/94 5:30 PM | 8/11/94 11:59 PM |
| REPLACE PROCESSOR | MARKETING | 7/15/94 6:01 AM | 11/12/94 1:22 PM |

CLOSE    GO TO

*FIG. 8*

TABLE 2

| CONDITION | ACTION | STATUS | UTILIZATION |
|---|---|---|---|
| RAPID RECOVERY FAULTS | | | |
| CHECK SYSTEM TEMPERATURE | X | | |
| CHECK SYSTEM FAN | X | | |
| CHECK CPU FAN | X | | |
| VIEW AND CLEAR THE POWER ON MESSAGE LOG | X | | |
| VIEW AND CLEAR CRITICAL ERRORS | X | | |
| VIEW AND CLEAR CORRECTABLE MEMORY ERRORS | X | | |
| REPLACE POWER SUPPLY | X | | |
| UPS STUFF | X | | |
| MASS STORAGE | | | |
| REPLACE DRIVE NOW | X | | |
| SCHEDULE DOWN TIME, REPLACE DRIVE | X | | |
| CHECK DRIVE | X | | |
| REPLACE ON-LINE SPARE | X | | |
| REPLACE ARRAY ACCELERATOR | X | | |
| REPLACE POWER SUPPLY | X | | |
| CHECK ARRAY ACCELERATOR | X | | |
| CONFIGURE LOGICAL DRIVE | X | | |
| CHECK DRIVE CONNECTION | X | | |
| CHECK UNIT TEMPERATURE | X | | |
| WRONG DRIVE REPLACE TRY AGAIN | X | | |
| REPLACE SCSI CONTROLLER | X | | |
| CHECK TEMPERATURE | X | | |
| CHECK UNIT SIDE PANEL | X | | |
| REPLACE POWER SUPPLY | X | | |

*FIG 9A*

TABLE 2 CONTINUED

| CONDITION | ACTION | STATUS | UTILIZATION |
|---|---|---|---|
| MASS STORAGE CONTINUED | | | |
| REPLACE FAN | X | | |
| REPLACE ACCELERATOR BATTERY | X | | |
| ACCELERATOR BAD DATA | X | | |
| LOGICAL DRIVE READY FOR REBUILD | | X | |
| LOGICAL DRIVE REBUILDING | | X | |
| OVERHEATED AND SHUTDOWN | | X | |
| VOLUME SPACE IS LOW | | | X |
| EXCESSIVE DISK ERRORS | | | X |
| SYSTEM BOARD | | | |
| REPLACE PROCESSOR | X | | |
| CPU UTILIZATION HIGH | | | X |
| EISA BUS UTILIZATION HIGH | | | X |
| NETWORK INTERFACE CARD | | | |
| HIGH NIC UTILIZATION | | | X |
| EXCESSIVE NIC ERRORS | | | X |
| SOFTWARE VERSION CONTROL | | | |
| UPGRADE SOFTWARE | X | | |
| SOFTWARE UPGRADE AVAILABLE | X | | |
| UPGRADE SYSTEM ROM | X | | |
| SYSTEM ROM UPGRADE AVAILABLE | X | | |
| UPGRADE DRIVE FIRMWARE | X | | |
| DRIVE FIRMWARE UPGRADE AVAILABLE | X | | |

MANAGING CONDITIONS IN A NETWORK

BACKGROUND

The invention relates to managing conditions in a network.

In a computer network, problems or other conditions associated with one or more network devices frequently pop up. To manage and maintain such problems in the network, an event log is typically stored on a selected network management system. To notify the management system of predetermined conditions, a network device sends a message (e.g., trap) to the management system. If the management server is on and it recognizes the trap condition, then an entry is added to the event log. However, if the management system is off when the message is transmitted, the message is missed and the event log is not updated.

As the number of devices connected to the network increases, the size of the event log also increases. To maintain the event log at a manageable size, a network administrator must manually remove entries as conditions are resolved.

SUMMARY

In general, in one aspect, the invention features a network system having a network device and a management system configured to identify a condition associated with the network device and to automatically update an event list in response to the condition being resolved.

Implementations of the invention may include one or more of the following features. The management system polls the network device to determine the status of the condition. The network device is configured to transmit a message to the management system in connection with an occurrence of the condition. The management system automatically updates the event list by determining if a condition on the event list has been resolved, and if so, removing a corresponding entry from the event list.

The invention may have one or more of the following advantages. Problems and other conditions kept in a log are automatically removed without user intervention. As a result, the log reflects the current state of all monitored network devices since it only keeps information for conditions that have not been resolved. Because a management system can poll devices for conditions in the network, the likelihood that conditions are missed by the management system is reduced.

Implementations of the invention may further include the following features. The management system includes a storage device for storing a description database identifying information associated with the condition. The description database can be updated to add more conditions. The description database includes an MIB variable associated with the condition.

In general, in another aspect, the invention features a computer system for connection to a network. The computer system includes a processor, a management program executed by the processor to identify a condition on the network, and a storage device on which an event list is stored. The management program updates the event list in response to the condition being resolved.

In general, in another aspect, the invention features a method of managing conditions in a network of network devices. A condition on the network is identified, and a computer system on the network automatically updates an event list in response to the condition being resolved.

In general, in another aspect, the invention features a computer program implemented in a computer for causing the computer to identify a condition in a network, and to automatically update an event list in response to the condition being resolved.

In general, in another aspect, the invention features a computer-implemented graphical user interface method that displays an event list containing an entry associated with an identified condition in a network, and automatically updating the event list in response to the condition being resolved.

In general, in another aspect, the invention features a display that is displayable by a management program on a computer monitor. The display has a first screen listing conditions associated with devices in a network. The first screen is updated in response to the conditions being resolved.

Other features and advantages will become apparent from the following description and from the claims.

DETAILED DESCRIPTION

Figure 1:
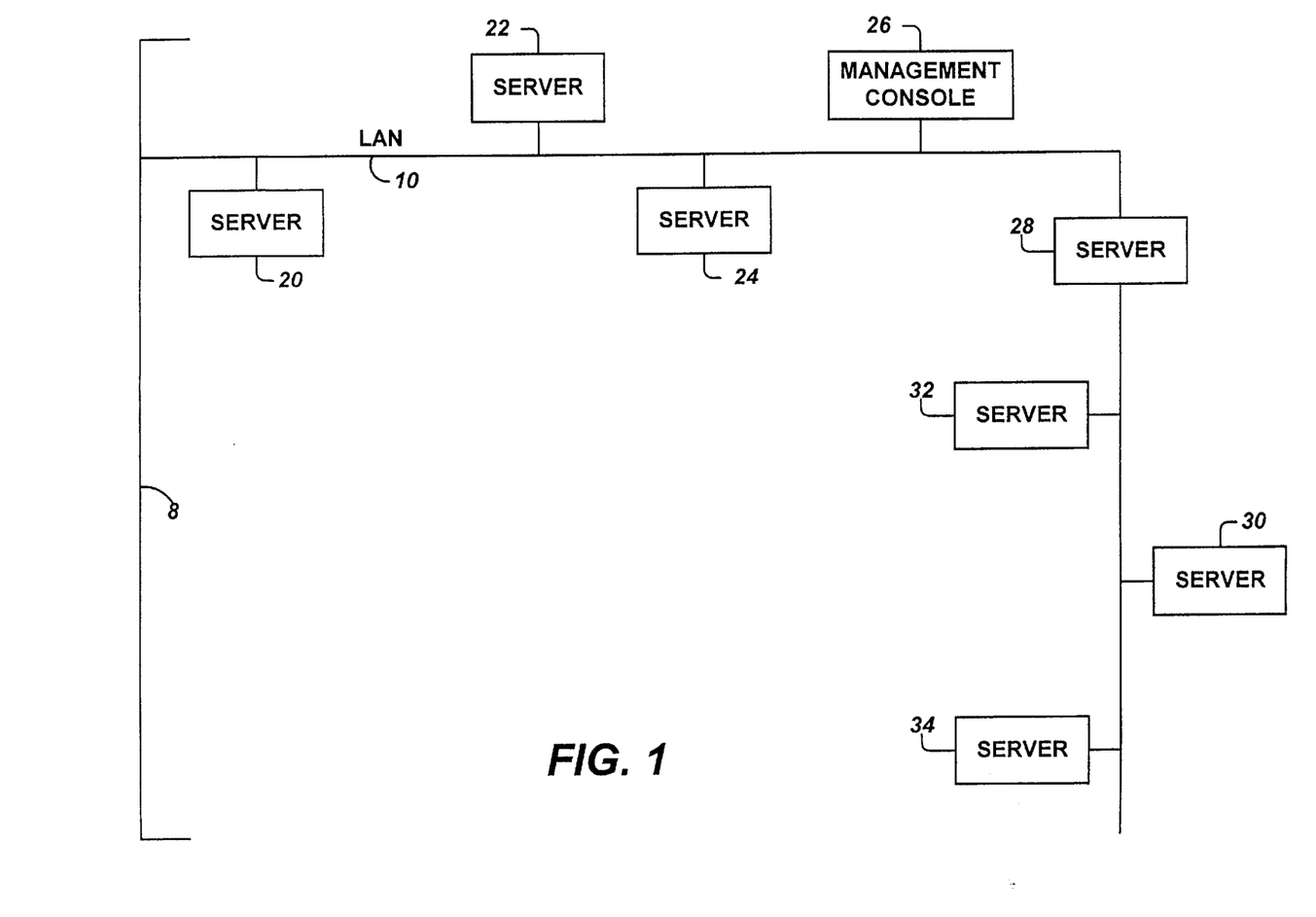
FIG. 1 is a block diagram of a computer network.

Referring to FIG. 1, an exemplary network 8 (including a local area network 10) includes computing devices 20, 22, 24, 26, 28, 30, 32 and 34. The devices can include desktop, laptop, hub, and gateway systems. The network 8 can be a TCP/IP (transmission control protocol/internet protocol), an IPX/SPX (a Novell Netware protocol), or other type protocol network.

A management console system 26 in the network 10 runs a network management application 100 (FIG. 2) that maintains an action list of identified problems and other conditions of network devices. The management application 100 can automatically detect when a condition has been resolved, in which case the condition is automatically removed from the action list. As a result, the action list maintains only conditions that currently exist, which provides a manageable list that a network administrator can quickly look through. A further advantage is that the action list does not need to be manually updated continually.

Figure 2:
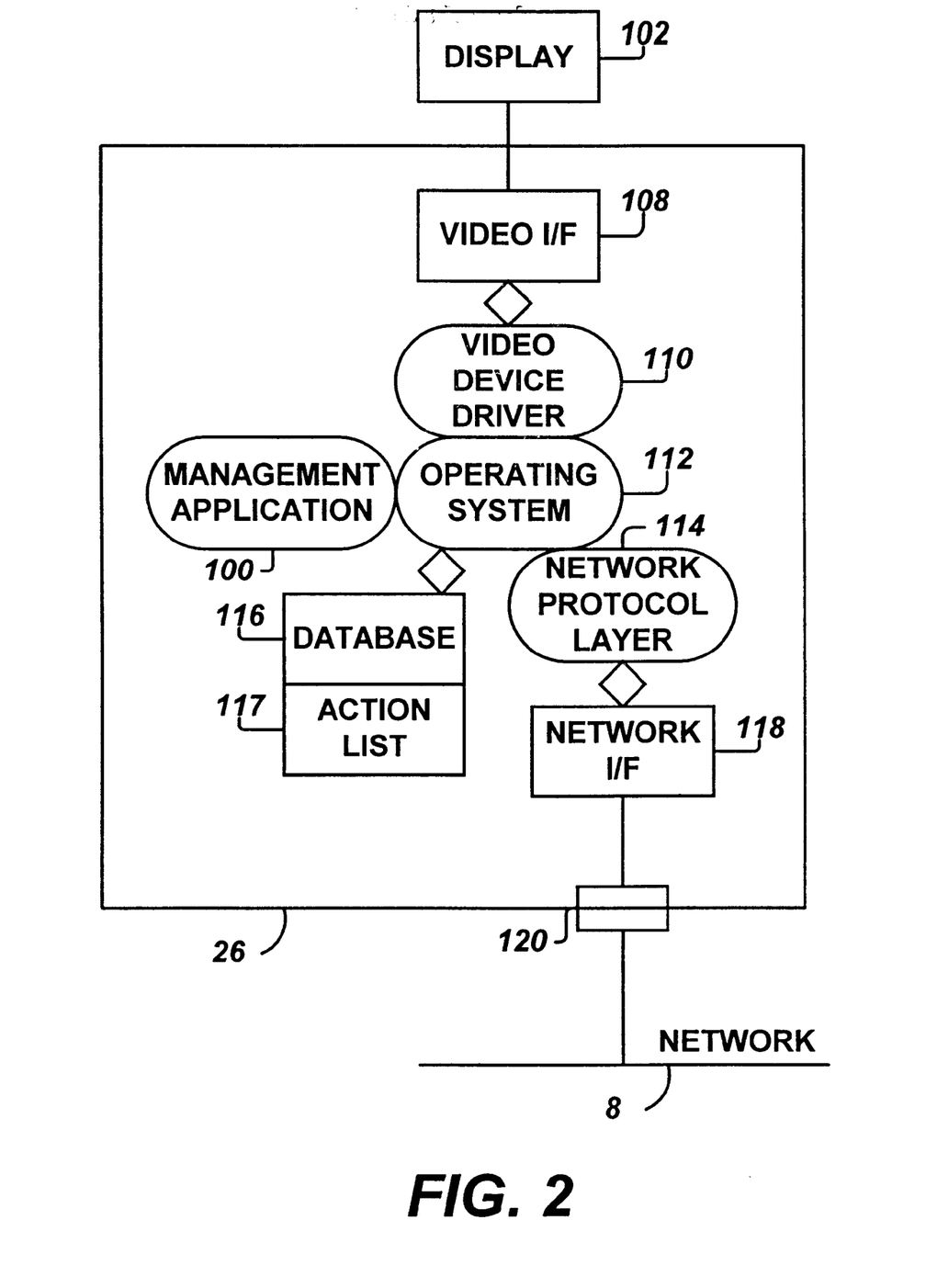
FIG. 2 is a block diagram of a management console system in the computer network.

In addition, the management application 100 maintains a description database 116 to identify information associated with a condition. Using the description database, the application can identify the status of a particular condition and determine the appropriate tasks to perform to resolve a particular condition.

Referring to FIG. 2, a network message passed over the network 8 and addressed to the management application 100 is received by a network interface 118 (including a network interface controller and its associated firmware) through the network connector 120 of the management console system 26. The message is passed to a network protocol layer 114 (such as a TCP/IP layer), which converts the network message to a format understood by the operating system 112 and the network management application 100. The description database 116 and action list 117 are stored on a storage device in the management console system 26. In addition, the action list 117 is displayable on a computer display 102 through a video device driver 110 and video interface 108.

Figure 3:
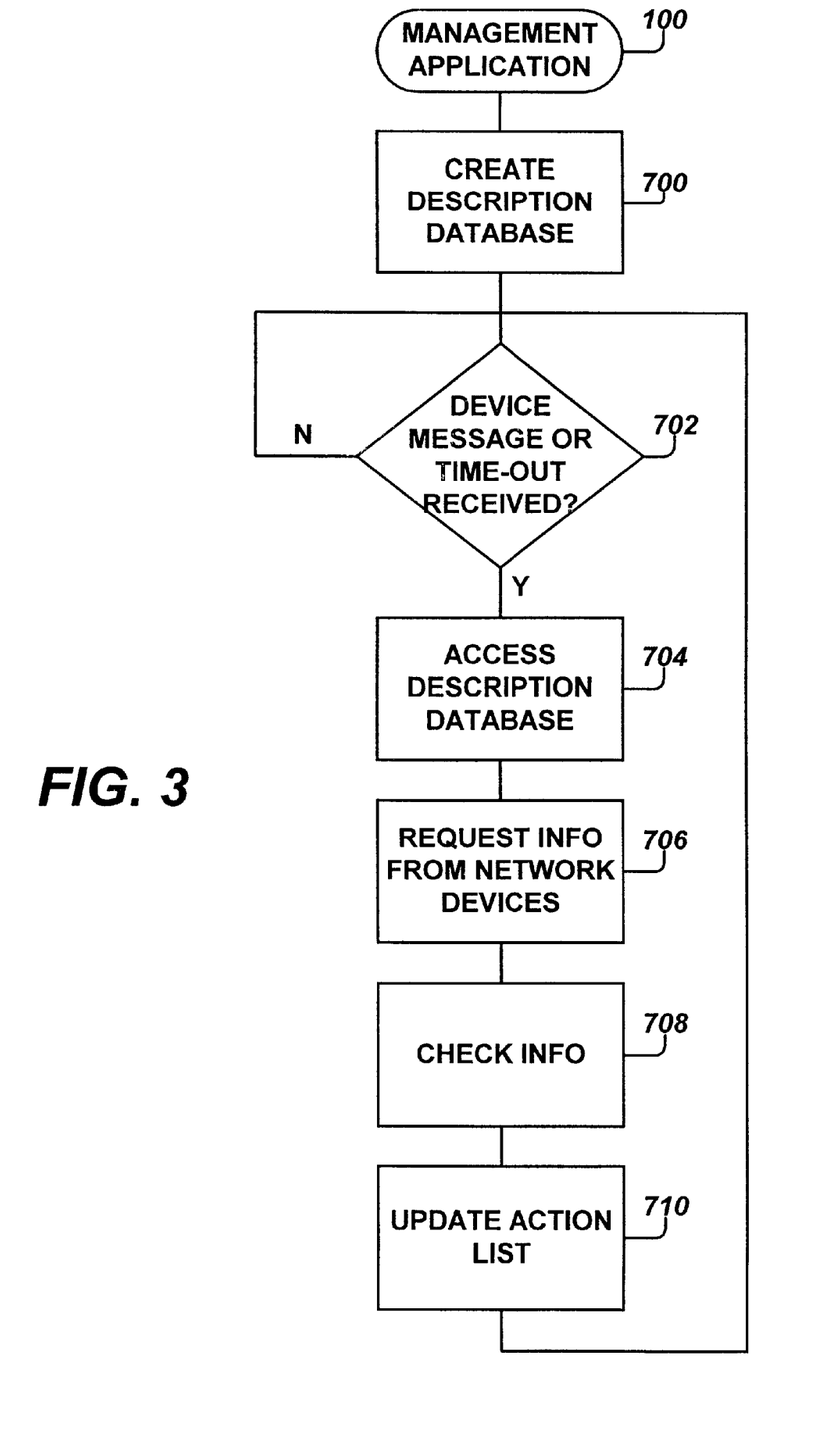
FIG. 3 is a flow diagram illustrating the steps of a network management application running on the management console system.
Figure 4:
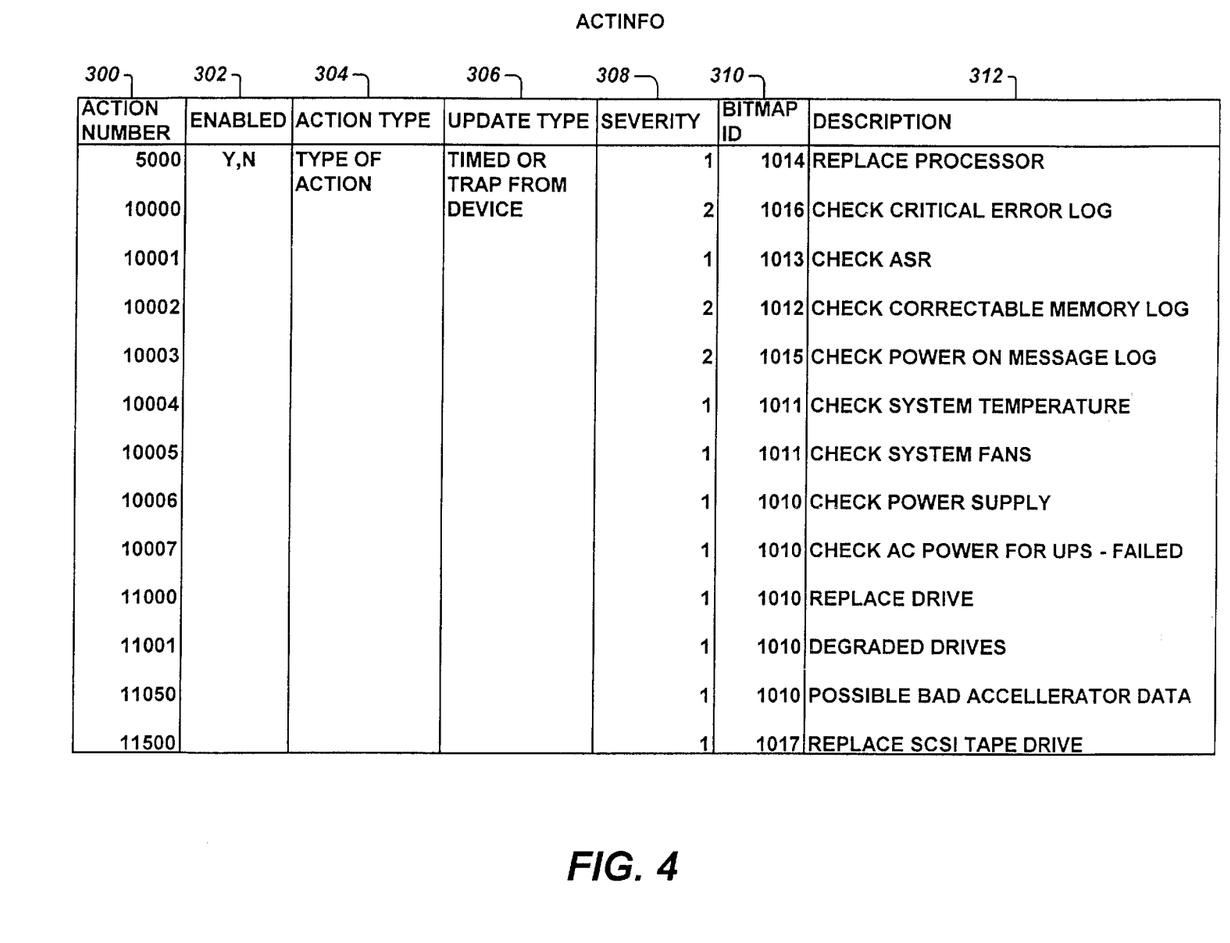
FIG. 4 is a table listing recognized conditions.
Figure 5:
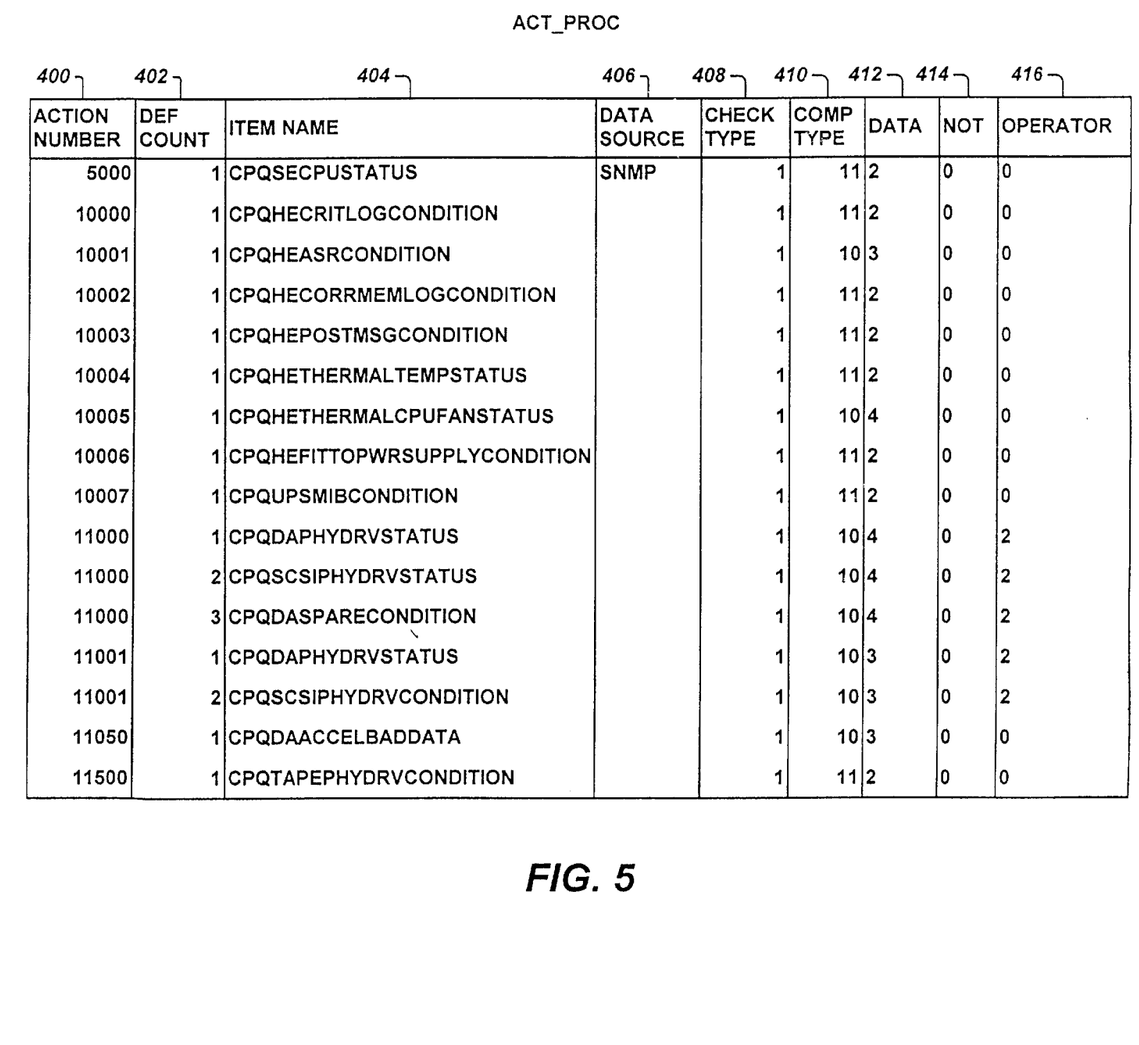
FIG. 5 is a table of information and steps associated with the conditions.

Referring to FIG. 3, to perform an automated network maintenance process, the management application 100 at step 700 first creates the description database 116 (including tables shown in FIGS. 4 and 5). The description database 116 stores the types of problems or conditions that are recognizable by the management application 100, information to be accessed and processed to determine the status of a condition, and tasks to be performed by a user to resolve the condition. The description database 116 can be easily updated by a network administrator to add new types of problems and conditions that the management application 100 can handle.

Next, the management application at step 702 waits for receipt of an event, which can be either a network device message or a timeout event. The network message can include a notification (in the form of a trap, for example) that a problem or other condition has occurred. The message identifies the particular condition or conditions of the sending device. A periodic timeout event can also be generated in the management application so that it can periodically poll the network devices for problems and other conditions.

The management application at step 704 then accesses the description database 116 to determine the types of information to request. If a specific network device trap is received, then the management application accesses the description database 116 to determine the information associated with the trap condition to request from the sending network device.

If the event is a timeout, then items identified in the description database 116 as requiring periodic updates are addressed. Query messages are sent to the network devices to request the required information. By using the polling feature, the management application 100 can identify when a condition has been resolved so that information associated with that condition can be removed from the action list 117.

Next, at step 706, the management application transmits requests to the appropriate network device or devices to request information relating to the relevant problems or conditions. When the requested information is received from the network device or devices, the management application at step 708 checks the information. Next, at step 710, the action list 117 is updated, by either adding entries (if new problems or conditions are found) or deleting entries (if the problems or conditions have been resolved).

Referring to FIGS. 4 and 5, the description database 116 includes two tables. The first table is the ACTINFO table, which lists action numbers (in column 300) and associated descriptions (in column 312). For example, action number 5000 corresponds to a Replace Processor action; action number 10004 corresponds to a Check System Temperature action; action number 11001 corresponds to a Degraded Drives action; and so forth. Other supported actions include threshold levels (e.g., fan speed exceeds a predetermined rate); utilization levels (e.g., CPU utilization 80%); and software version control, in which the management application monitors software versions on network devices, reports out of date software on the action list, and informs the user that a software upgrade is available or that a software upgrade must be performed to prevent a critical bug.

The ACTINFO table also includes an Enabled column 302 to indicate whether the particular action is enabled or disabled (Y for enabled and N for disabled). If an action is disabled, then that particular action is not acted upon by the management application 100. An Action Type column 304 categorizes the fault type of the action (e.g., a mass storage fault, a system board fault, network interface card fault, a software version control fault, etc.).

An Update Type column 306 indicates the type of updates requested for the particular action—whether updates are timed (periodic polling) or performed in response to a trap from a network device. If the latter, then the management application 100 updates the action list 117 only when it receives a trap from a network device and does not periodically issue queries for the particular action. A Severity column 308 indicates the severity of the particular action, with the value 1 indicating the most severe condition and higher values indicating less severe conditions. A Bitmap ID column 310 identifies a graphical user interface (GUI) element (e.g., an icon) associated with an action that is displayed. Thus, the Replace Processor action can be associated with a specific icon displayed by the computer to the user.

In FIG. 5, an ACT_PROC table includes an action number column 400 listing the same action numbers as in the ACTINFO table in FIG. 4. In addition, the ACT_PROC table includes an Item Name column 404, which lists variables, (e.g., Management Information Base or MIB variables according to the SNMP or Simple Network Management Protocol), which are checked by the management application 100 to determine the status of the particular action. A Data Source column 406 specifies the particular source of the action, e.g., an SNMP source or other protocol source. A Check Type column 408 indicates the type of checking required of the condition listed in column 404 for a particular action. For example, a value of 1 indicates an "index scan" while a value of 2 indicates a "full scan". A full scan checks all drives and produces a true result if any combination of the devices contains the conditions to be checked. Thus, for example, if an action is associated with three conditions and all three must be true (AND operation), then the full scan produces a true result if condition 1 is found on device X, condition 2 is found on device Y, and condition 3 is found on device Z, where X, Y, and Z can be the same or different devices.

An index scan, on the other hand, requires that the conditions to be checked must all be located on one device. In the example above, conditions 1, 2, and 3 must all be on one device for the index scan to be true.

A Comp Type column 410 has a number of different values, e.g., 10, 11, 12, 20, 21, 22, or 23, to indicate the type of comparison to be performed on the variables listed in column 404. The different Comp Type values and what they represent are listed below in Table 1.

TABLE 1

| Comp Type Number | Comparison |
|---|---|
| 10 | Num = |
| 11 | Num > |
| 12 | Num < |
| 20 | String = |
| 21 | String > |
| 22 | String < |
| 23 | In String |

The comparison is performed between the variable in column 404 and the data field in column 412. For example, if the Comp Type value is 10, then the management application 100 determines if the particular variable contains a number equal to the corresponding value in column 412. As another example, a Comp Type Number of 21 would cause the management application to determine if the particular variable contains a string greater than the corresponding specified value. A Comp Type Number of 23 would cause the application to determine if a specified value is contained in the string in the variable.

A Not column 414 specifies whether the result of the comparison should be inverted; a value of 0 indicates no inversion while a value of 1 indicates inversion. An Operator column 416 indicates the type of operation to be performed with another variable associated with the same action number. For example, for action number 11000, three variables are specified, including cpqDaPhyDrvStatus, cpqScsiPhyDrvStatus, and cpqDaSpareCondition. The value in the Def Count column 402 indicates the sequence of the three variables associated with an action (e.g., 1, 2, 3). A value of 2 in the Operator column 416 indicates that an OR operation is performed between the variable in the corresponding row and the variable in the next row associated with the same action. A value of 1 would indicate an AND operation and a value of 0 indicates a NOP or no operation.

Thus, the ACT_PROC table specifies the relevant parameters associated with an action and how the parameters are to be processed to determine the status of a condition.

Figure 6:
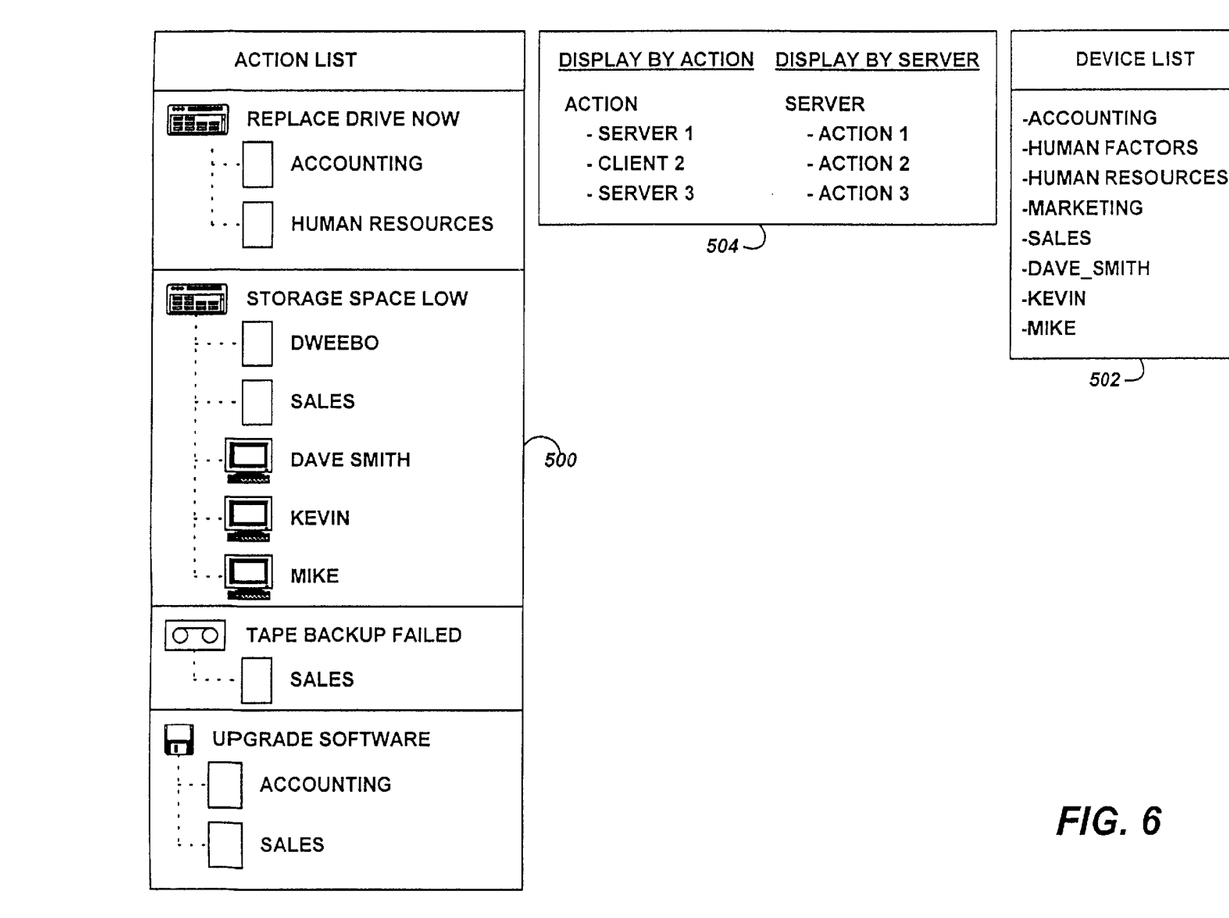
FIG. 6 shows an action list and device list maintained by the network management application.

Referring to FIG. 6, an Action List screen 500 displays information from the action list 117. The screen 500 shows conditions associated with network devices, which are listed in a Device List window 502. Exemplary network devices are identified as Accounting, Human$_{13}$ Factors, Human_ Resources, Marketing, Sales, Dave_Smith, Kevin, and Mike. In this example, Dave_Smith, Kevin, and Mike are desktop units while Accounting, Human_Factors, Human_ Resources, Marketing and Sales are servers.

There are two different ways of displaying the action list screen 500, which are to display by action or to display by server (as shown by 504). The action list screen provides a convenient means of displaying information associated with network device conditions to a network administrator. If a condition is resolved, the corresponding item is removed from the action list. Each action has a priority, as indicated by the value in the Severity column 308 in FIG. 4, and actions with higher priorities are displayed toward the top of the list.

Figure 7:
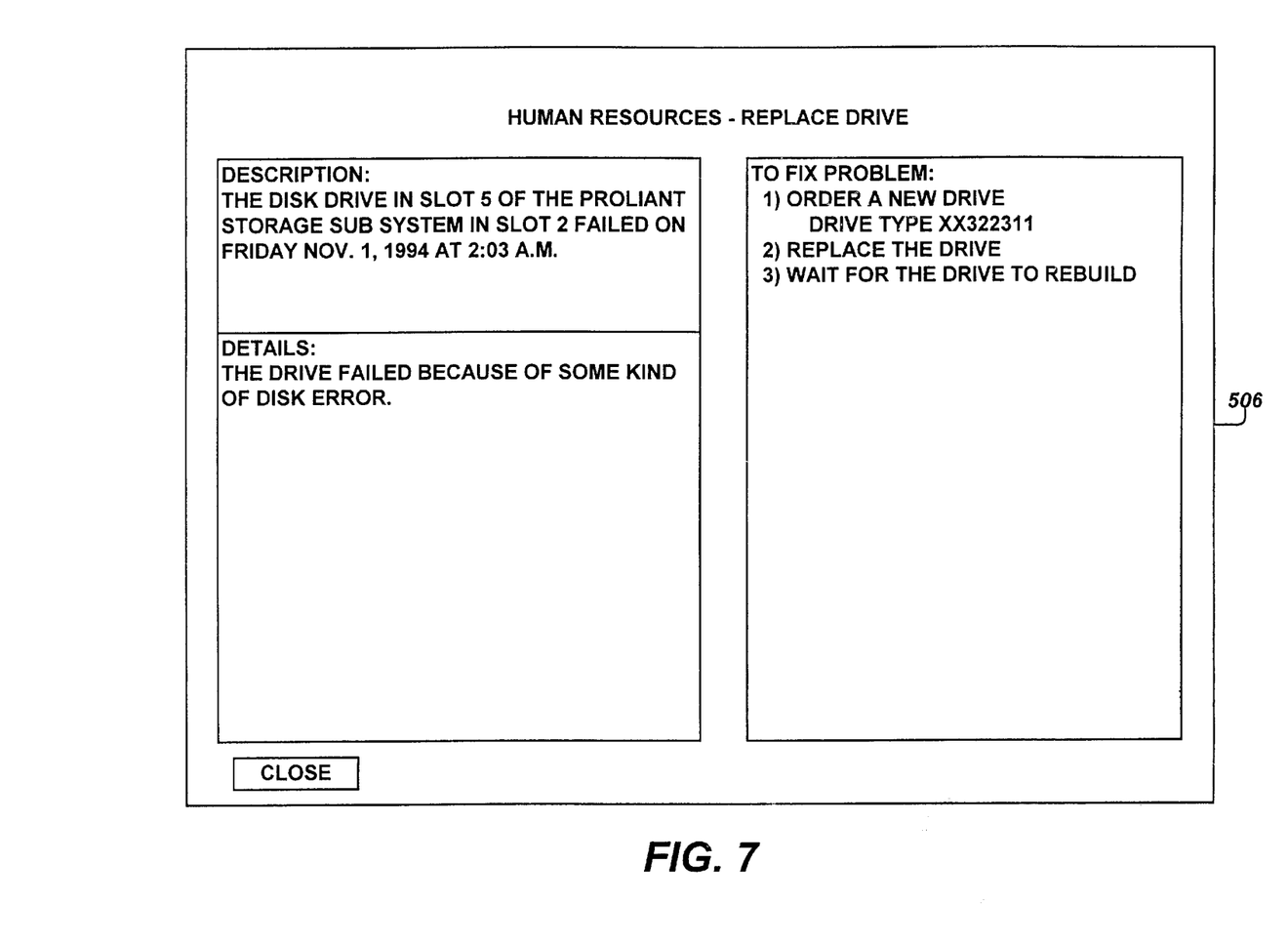
FIG. 7 shows an action detail screen describing the specific help for an action.

Referring to FIG. 7, an Action Detail screen 506 provides specific help to the user for each action. The purpose of this screen is to tell the user exactly what happened, and the steps that must be performed to resolve the problem. The action details include a description of the problem, specific details about the problem, and a list of steps to correct the problem. Double clicking on an action in the Action List screen 500 opens the Action Detail screen.

Figure 8:
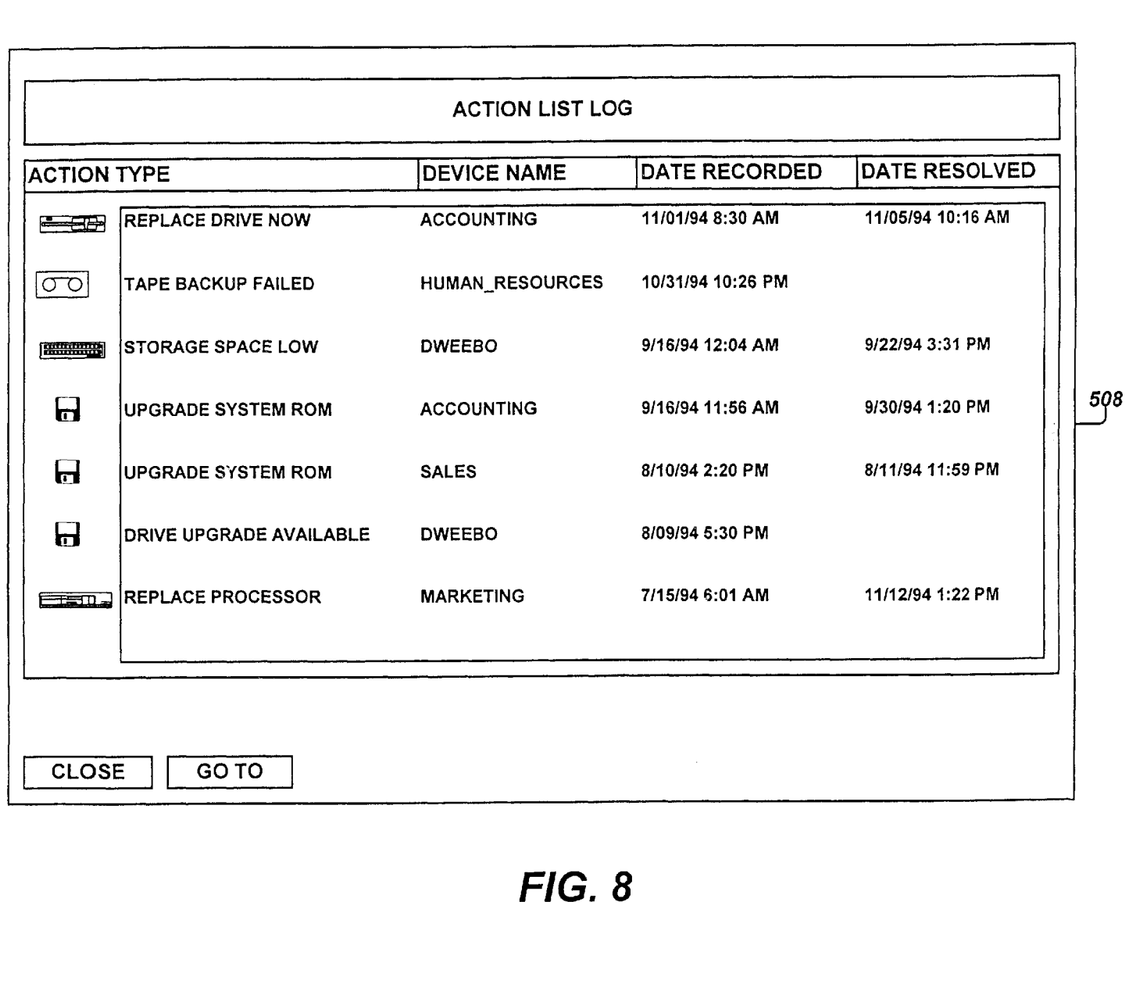
FIG. 8 shows an action list log screen listing the complete history of the action list.

FIG. 8 shows an Action List Log screen 508, which contains a complete history of the action list. As items are added or removed from the list, they are recorded in the log. As actions come and go, a user who is not constantly watching the screen may miss an important event. The user can conveniently refer to the log to determine events that have occurred. For example, if the user sets a threshold on CPU utilization for 85%, the CPU utilization action will be entered into the log as the utilization varies.

Figure 9A:
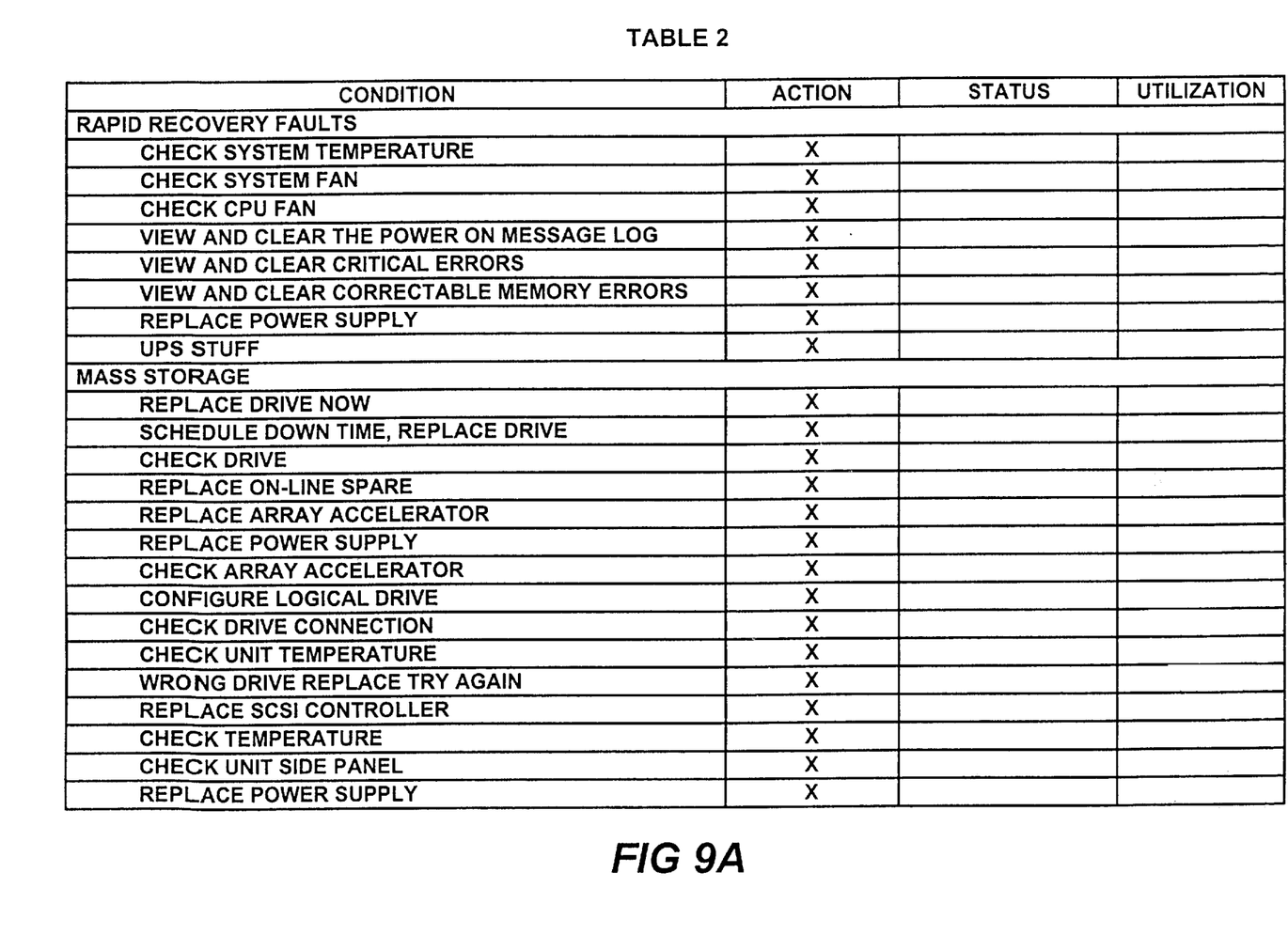
FIGS. 9A and 9B are a table listing the conditions identified by data type and fault type.
Figure 9B:
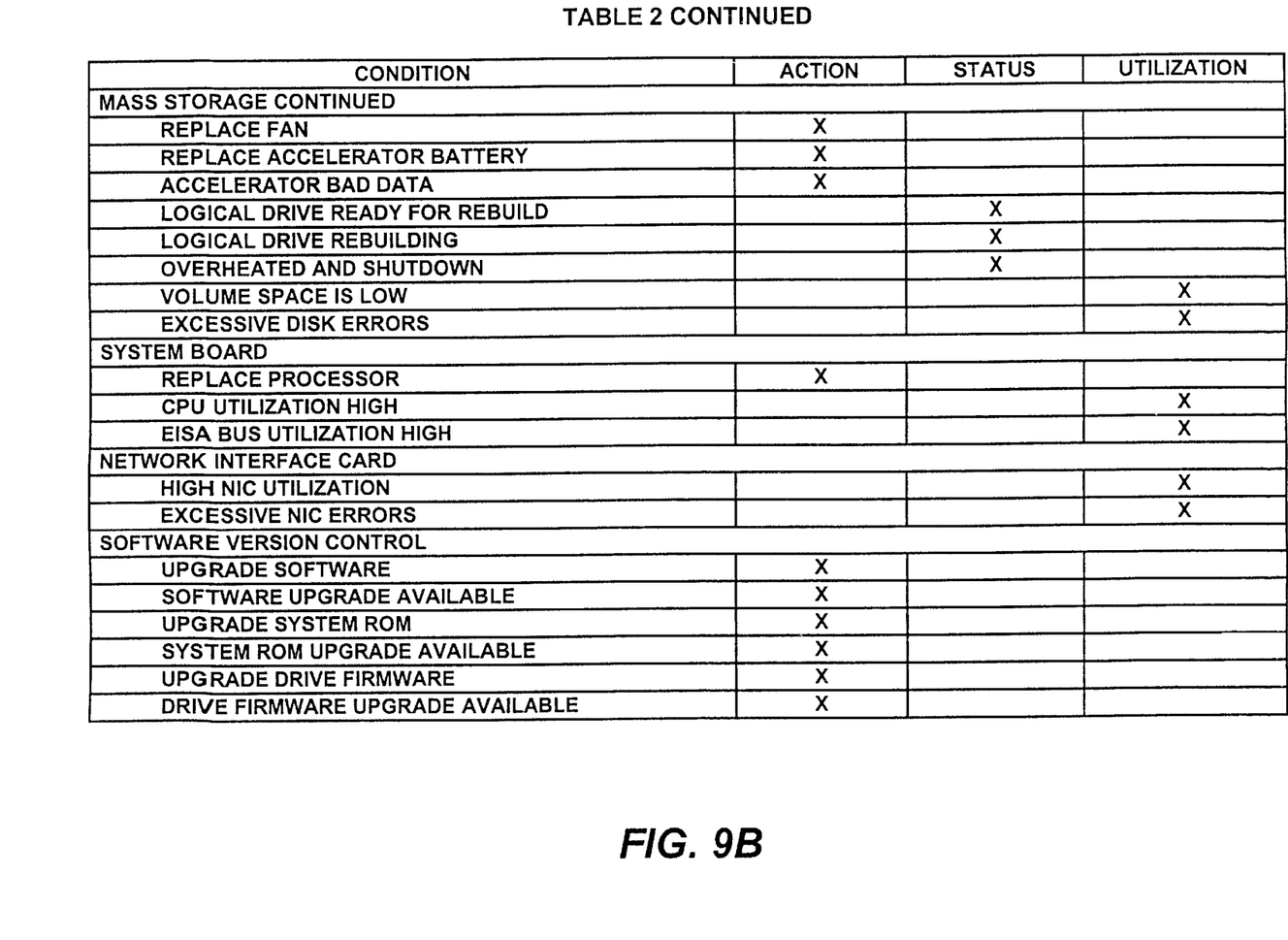

The conditions are divided according to three data types: action data, status data, and utilization data. Action data refers to an action that needs to be taken by the administrator to correct a system fault or degraded condition. Status data refers to the status of a system component. Utilization data displays performance or utilization information. In addition, as noted above, the conditions are also grouped according to fault types: rapid recovery faults, mass storage faults, system board faults, network interface card faults, and software version control faults. Table 2 (in FIGS. 9A and 9B) lists exemplary conditions by data type and fault type.

Figure 10:
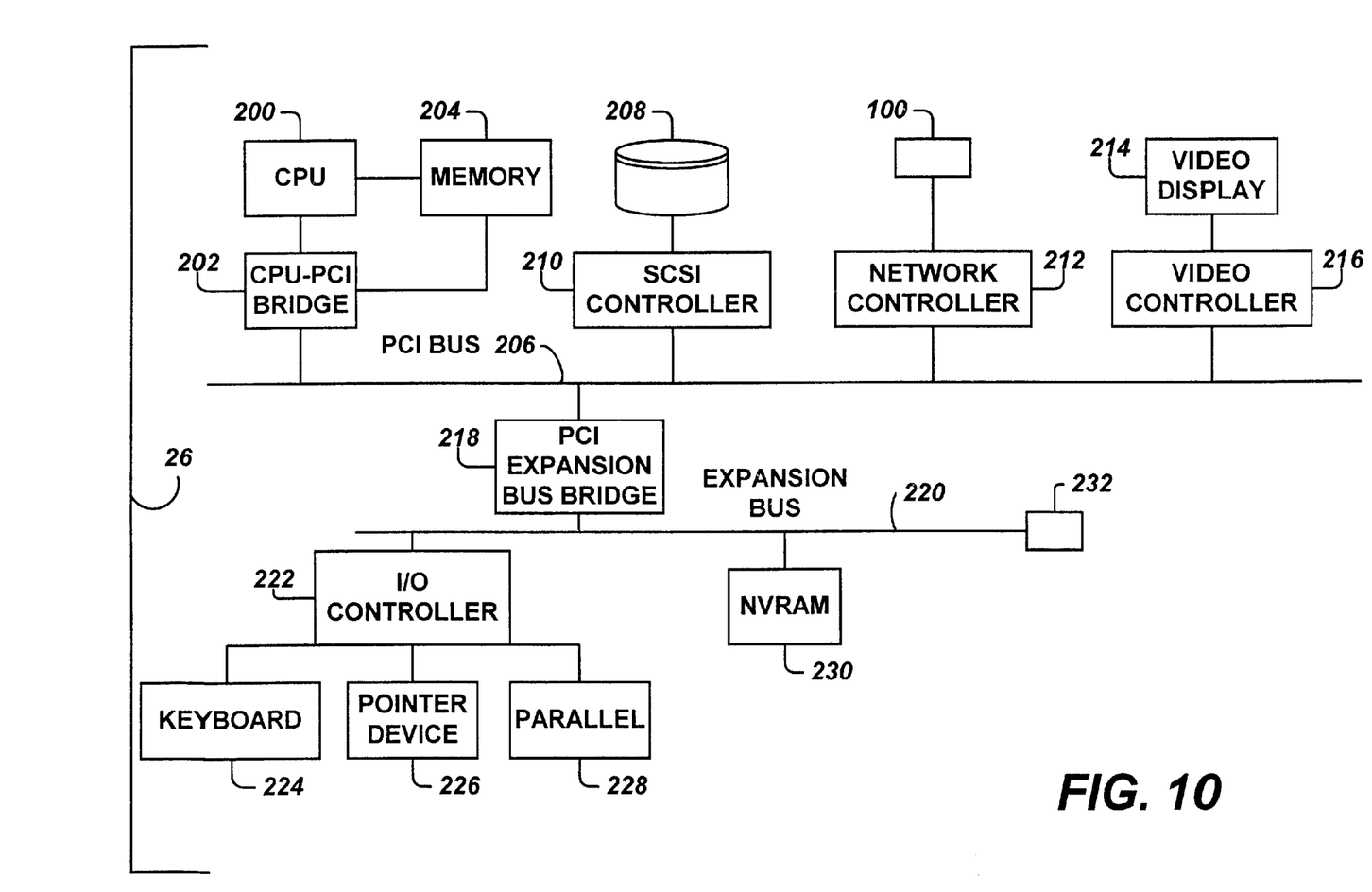
FIG. 10 is a block diagram of a computer system such as that used to implement the management console system.

Referring to FIG. 10, the physical components of the management system 26 are illustrated. The system 26 includes a central processing unit (CPU) 200 connected by a CPU-PCI bridge 202 to a Peripheral Component Interconnect (PCI) bus 206. A main memory 204 is connected to the CPU 200 and CPU-PCI bridge 202. A mass storage device 208, in the form of hard disk drives, for example, is connected to a SCSI controller 210, which is in turn connected to the PCI bus 206. A network controller card 212, which is part of the network interface 102 or 114 described in FIG. 2, is also connected to the PCI bus 206. A video controller 216 controls signals transmitted between the PCI bus 206 and a video display 214.

An expansion bus 220, such as the Extended Industry Standard Architecture (EISA) or the Industry Standard Architecture (ISA) bus, is connected to the PCI bus 206 through a PCI-expansion bus bridge 218. The expansion bus 220 is connected to an input/output (I/O) controller 222, which provides interface ports to a keyboard 224, a pointer device 226 (such as a mouse), and a parallel port 228. The I/O controller 222 also controls access to a non-volatile random access memory (NVRAM) 230, which can be implemented with a flash memory or an EEPROM. The NVRAM is used to store the system BIOS for performing the power up sequence in the computer system 26. Expansion slots 232 are connected to the expansion bus 220 to provide further expansion capabilities.

Other embodiments are within the scope of the following claims. For example, a modified version of the management application can be loaded on network devices other than the management console system 26. In this alternative network system, the local management application in each network device can obtain and process the information as indicated in a locally loaded description database and send that information to the management console system in place of a trap message.

What is claimed is:

1. A computer system for connection to a network, comprising:

a processor;

a management program executed by the processor to identify a plurality of conditions on the network; and a storage device on which an action list and an action log are stored, wherein the management program updates the action list without user intervention in response to the condition being resolved, such that any resolved operating condition is removed and only unresolved conditions remain on the action list, the management program providing a user access to the action list and instructions related to correcting a problem condition on the action list and wherein the management program updates the action log to contain a history of the operating conditions of the action list.

2. The computer system of claim 1, wherein at least one network device, connected to the network, transmits a message to the management program in connection with an occurrence of said plurality of conditions.

3. The computer system of claim 1, wherein at least one network device, connected to the network, transmits a message to the management program in connection with an occurrence of at least one of said plurality of conditions.

4. The computer system of claim 1, wherein the storage device further stores a description database identifying information associated with the plurality of conditions.

5. The computer system of claim 4, wherein the description database can be updated to add more conditions.

6. The computer system of claim 1, further comprising a video display on which the action list can be displayed.

7. The computer system of claim 6, wherein displayed entries of the action list are selectable by a user to allow further information to be displayed.

8. A network system comprising:
 a plurality of network devices including a first network device;
 a network connecting said plurality of network devices;
 a management system connected to said network, the management system configured to identify a plurality of operating conditions associated with the plurality of network devices, the management system further configured to produce an action list for the plurality of operating conditions which is updated to provide a user an accurate status of the plurality of operating conditions associated with the plurality of network devices, said management system further being configured to produce an action log containing a history of the operating conditions of the action list; and
 a storage device on which the action list and the action log are stored, wherein the management system updates the action list without user intervention in response to an operating condition being resolved such that any resolved operating condition is removed and only unresolved operating conditions remain on the action list.

9. The network system of claim 8, wherein the management system polls the plurality of network devices to determine the status of said plurality of operating conditions.

10. The network system of claim 8, wherein at least one of said plurality of network devices is configured to transmit a message to the management system in connection with an occurrence of at least one of said plurality of operating conditions.

11. The network system of claim 8, wherein the management system includes a storage device for storing a description database identifying information associated with the action list.

12. The network system of claim 11, wherein the description database can be updated to add more conditions.

13. A method for managing conditions in a network, comprising the acts of:
 identifying operating conditions of a plurality of devices coupled to a network;
 generating an action list and an action log based on the identified operating conditions;
 updating the action list and the action log without user intervention;
 determining, without user intervention, whether one of the identified operating conditions represented on the action list has been resolved; and
 removing, without user intervention, any resolved operating condition from the action list and recording the resolved operation condition on the action log.

14. The method as recited in claim 13, comprising the act of:
 maintaining a database of known operating conditions, the database comprising
 information related to each known operating condition;
 accessing the database to determine information relevant to one of the identified operating conditions; and
 requesting the relevant information from the device associated with the one of the identified operating conditions.

15. The method as recited in claim 14, wherein the database further comprises instructions relevant to resolving the known operating conditions, and wherein the method comprises the act of:
 providing a user access to the action list and to the instructions relevant to resolving the one of the identified operating conditions on the action list.

16. The method as recited in claim 13, comprising the act of:
 storing the action list on a storage device.

17. The method as recited in claim 13, comprising the act of:
 displaying the action list on a display device accessible to a user.

18. The method as recited in claim 13, wherein the act of identifying operating conditions comprises the act of:
 periodically polling the devices on the network for data related to the operating conditions.

19. The method as recited in claim 13, wherein the act of identifying operating conditions comprises the act of:
 receiving messages transmitted by the devices on the network, the messages comprising data related to the operating conditions.

* * * * *